(12) United States Patent
Hayashi et al.

(10) Patent No.: US 8,255,019 B2
(45) Date of Patent: Aug. 28, 2012

(54) SLIDABLE PORTABLE ELECTRONIC DEVICE

(75) Inventors: Shinya Hayashi, Daito (JP); Nobuyuki Kitamura, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/070,681

(22) Filed: Mar. 24, 2011

(65) Prior Publication Data
US 2011/0237305 A1    Sep. 29, 2011

(30) Foreign Application Priority Data
Mar. 24, 2010    (JP) ................. 2010-067280

(51) Int. Cl.
*H04M 1/00*    (2006.01)
*H04B 1/04*    (2006.01)
(52) U.S. Cl. .................................. 455/575.1
(58) Field of Classification Search ........ 455/5
See application file for complete search history.

(56) References Cited

U.S. PATENT DOCUMENTS

| 7,526,082 | B2* | 4/2009 | Abe et al. ............... 379/433.11 |
| 7,783,331 | B2* | 8/2010 | Chung et al. .............. 455/575.1 |
| 2006/0293097 | A1* | 12/2006 | Shimizu et al. ........... 455/575.7 |
| 2009/0149225 | A1* | 6/2009 | Yokota et al. ............. 455/575.3 |
| 2009/0291709 | A1* | 11/2009 | Lee et al. .................. 455/556.2 |

FOREIGN PATENT DOCUMENTS
JP    2009-071364 A    4/2009
* cited by examiner

*Primary Examiner* — Rafael Pérez-Gutiérrez
*Assistant Examiner* — Frank Donado
(74) *Attorney, Agent, or Firm* — Procopio, Cory, Hargreaves & Savitch LLP

(57) ABSTRACT

A slidable portable electronic device comprising a first cabinet and a second cabinet slidably coupled on a surface of the first cabinet, the first cabinet comprising at least one of an operating unit and a display unit provided on a surface of the first cabinet to be exposed when the second cabinet is slidingly moved in the opening direction, a through-hole formed extending to an inner space from a surface of the first cabinet that remains unexposed when the second cabinet is slidingly moved in the opening direction, a microphone having a sound collecting face and provided on the inner space side of the first cabinet, with the sound collecting face facing the through-hole, and a gap formed between the first cabinet and the second cabinet and communicating with the through-hole.

3 Claims, 6 Drawing Sheets

SLIDABLE PORTABLE ELECTRONIC DEVICE

CROSS-REFERENCE TO RELATED APPLICATION

This patent application claims the priority of Japanese Patent Application No. 2010-067280 filed on Mar. 24, 2010, which is incorporated herein by reference.

BACKGROUND OF THE INVENTION

1. Field of the Invention

The present invention relates to a slidable portable electronic device comprising a microphone, such as a slide mobile phone.

2. Description of the Related Art

A slide mobile phone comprises a first cabinet and a second cabinet slidably coupled on the first cabinet. The first cabinet is provided on the surface thereof with an operating unit having a plurality of operating key. The second cabinet is provided on the surface thereof with display unit having a liquid crystal display panel (for example, see Japanese Unexamined Patent Publication No. 2009-71364). By relatively moving the first cabinet and the second cabinet in a sliding direction, the slide mobile phone can be placed in a closed state where the operating unit is covered with the second cabinet and in an opened state where the operating unit of the first cabinet is exposed. On the other hand, the surface of the first cabinet is provided with a covered region that remains covered with the second cabinet, in either state whichever the slide mobile phone is in the closed state or in the opened state.

The surface of the first cabinet is further formed with a sound collecting hole that extends from the surface of the first cabinet to an inner space, at an area that is to be exposed when the slide mobile phone is in the opened state but is not the region wherein the operating unit is provided. In addition, the first cabinet is provided on the inner space side thereof with a microphone having a sound collecting face, in a posture where the sound collecting face faces the sound collecting hole.

As stated above, with the conventional slide mobile phones, the sound collecting hole is formed in the area to be exposed when the phone is placed in the opened state, and therefore reduces the area to install the operating unit and/or the display unit. Thus, the area available to install the operating unit is insufficient, leading to a likelihood of lowering operability and visibility of the slide mobile phone.

SUMMARY OF THE INVENTION

An object of the present invention is to provide a slidable portable electronic device, such as a slide mobile phone, which includes a first cabinet having a sufficient area available to install the operating unit and/or the display unit.

A slidable portable electronic device according to the present invention comprises a first cabinet and a second cabinet slidably coupled on a surface of the first cabinet, the first cabinet comprising:

an operating unit and/or a display unit provided on a surface of the first cabinet to be exposed when the second cabinet is slidingly moved in the opening direction;

a through-hole formed extending to an inner space from a surface of the first cabinet that remains unexposed when the second cabinet is slidingly moved in the opening direction;

a microphone having a sound collecting face and provided on the inner space side of the first cabinet, with the sound collecting face facing the through-hole; and a gap formed between the first cabinet and the second cabinet and communicating with the through-hole.

In the slidable portable electronic device described above, the first cabinet is formed with the through-hole opposed to the microphone, at the surface that remains unexposed even when the first cabinet is slidingly moved in the opening direction. Therefore, the through-hole is not required to form on the surface to be exposed when the device is in the opened state. This ensures that the exposed area provides a sufficient area available to install the operating unit and/or the display unit.

As the operating unit and/or the display unit can be provided at a wider area, the operability and visibility of the slidable portable device can be enhanced.

Even in the case where the slidable portable device is downsized, a sufficient area available to install the operating unit and/or the display unit can be obtained.

In addition, even in either closed or opened state of the device, the outside sound passes through the gap formed between the first and second cabinets into the through-hole to reach the sound collecting face of the microphone. Therefore, the outside sound can be clearly captured by the microphone through the gap and the through-hole without involving the second cabinet, to thereby inhibit the lowering of sound quality etc.

Further, in the opened state of the device, the through-hole is not directly exposed to outside, so that the waterproof and dustproof properties can be improved as compared to the conventional slidable portable electronic device.

DETAILED DESCRIPTION OF THE PREFERRED EMBODIMENTS

Hereinafter, the present invention embodied as a slide mobile phone 10 will be described in detail with reference to the drawings.

Figure 1:
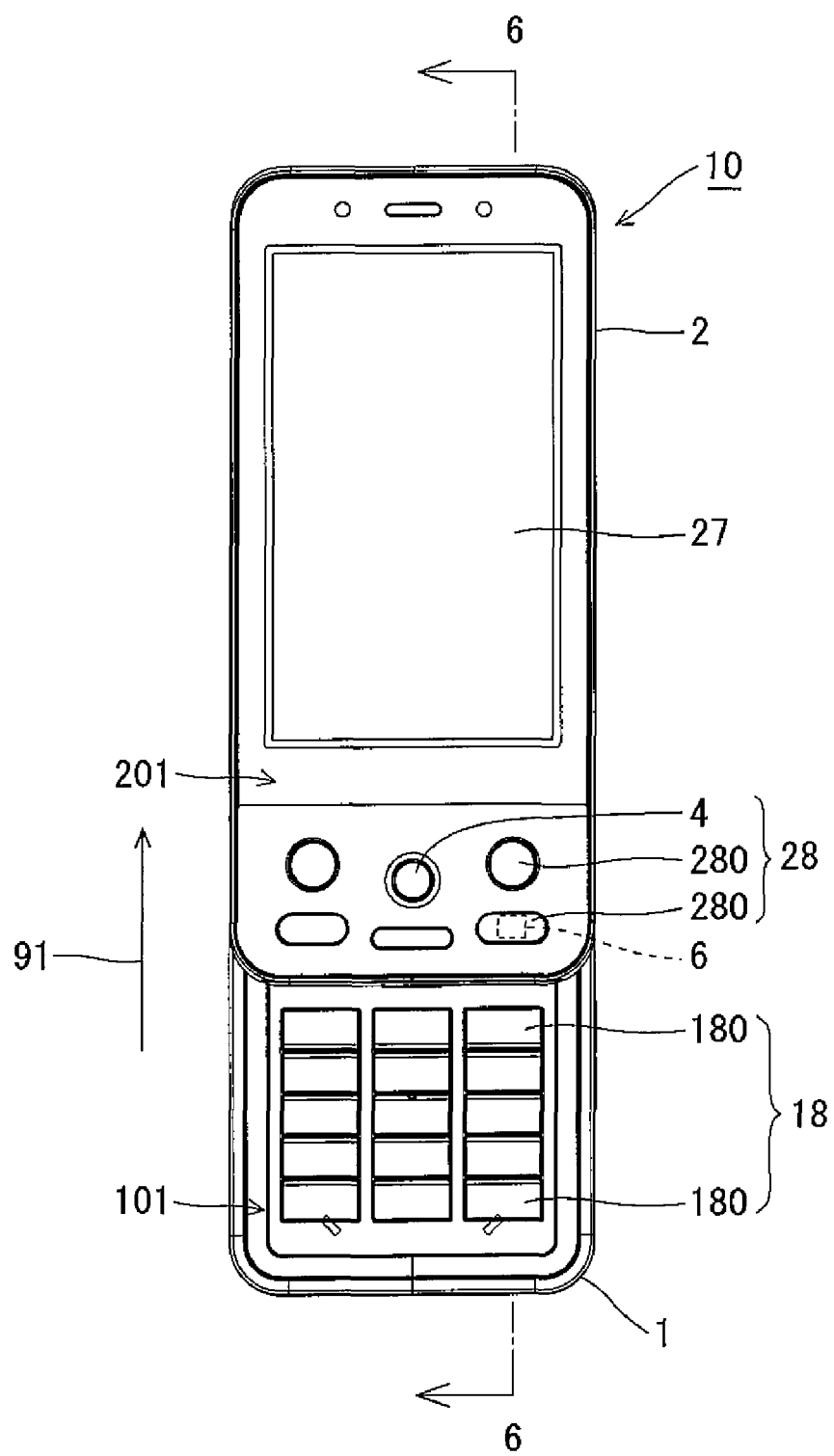
FIG. 1 is a front view illustrating a slide mobile phone according to an embodiment of the present invention.

FIG. 1 is a front view illustrating a slide mobile phone 10 according to an embodiment of the present invention. As illustrated in FIG. 1, the slide mobile phone 10 comprises a first cabinet 1 and a second cabinet 2 which are slidably coupled to each other. A first operating unit 18 constituted by a plurality of operating keys 180 is provided on a front surface 101 of the first cabinet 1. A display unit constituted by a liquid crystal display panel 27 is provided on a front surface 201 of the second cabinet 2. The front surface 201 of the second cabinet 2 is also provided with a second operating unit 28 constituted by a lever switch 4 and a plurality of operating keys 280 in a region that differs from the region in which the liquid crystal display panel 27 is provided.

Figure 2:
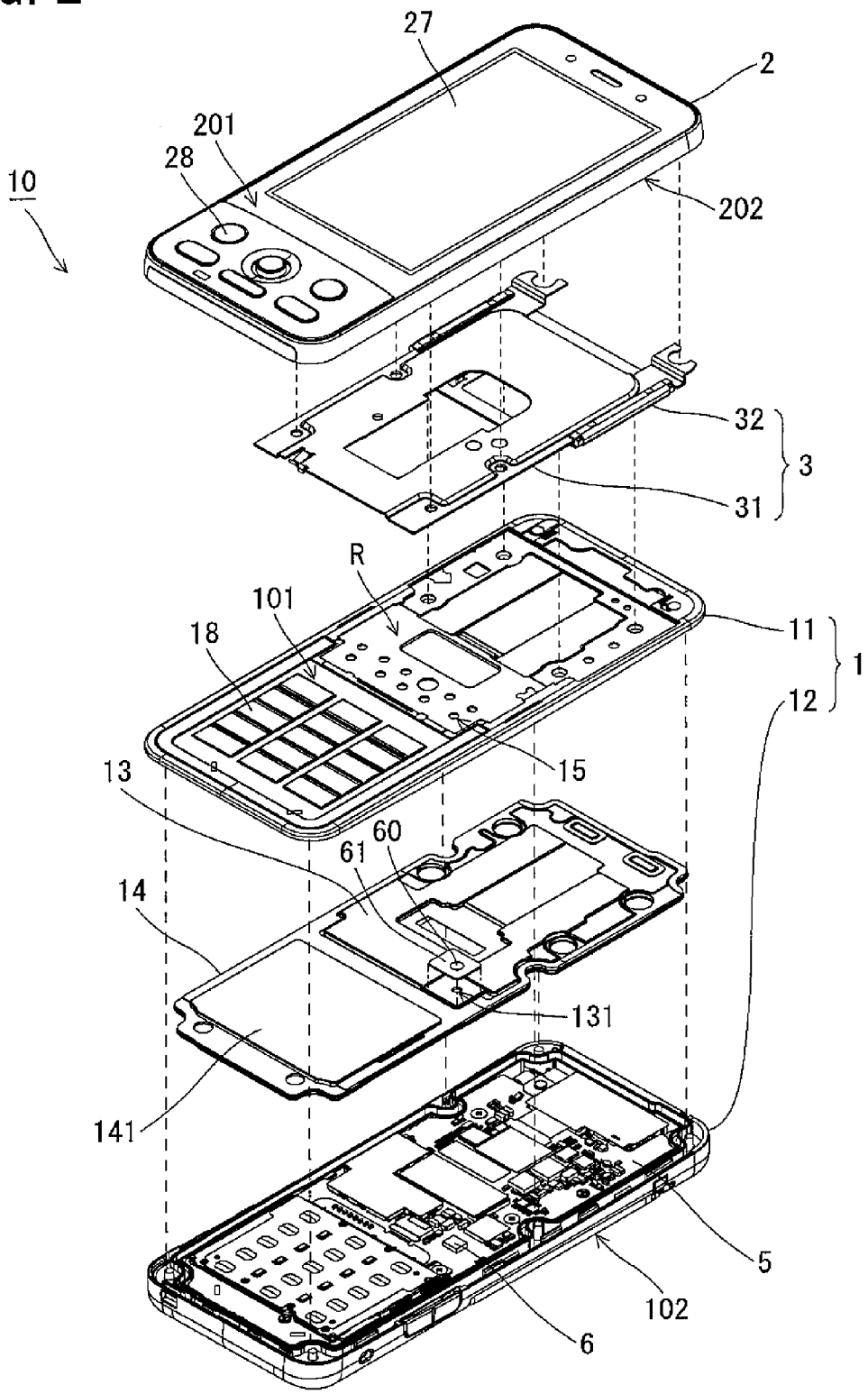
FIG. 2 is an exploded perspective view of the slide mobile phone.

FIG. 2 is an exploded perspective view of the slide mobile phone 10. As illustrated in FIG. 2, a sliding mechanism 3 that slidably couples the first cabinet 1 and the second cabinet 2 is provided between the first cabinet 1 and the second cabinet 2, and the sliding mechanism 3 is constituted by a slider 31 and a slide regulating portion 32. The slider 31 is fixed to an opposed surface of the side of the second cabinet 2 (in other words, a rear surface 202 of the second cabinet 2) among the opposed surfaces of the first cabinet 1 and the second cabinet 2. On the other hand, the slide regulating portion 32 is fixed to an opposed surface of the side of the first cabinet 1 (in other words, the front surface 101 of the first cabinet 1) among the opposed surfaces of the first cabinet 1 and the second cabinet 2 or, more specifically, to a region that differs from the region in which the first operating unit 18 is provided.

Figure 3:
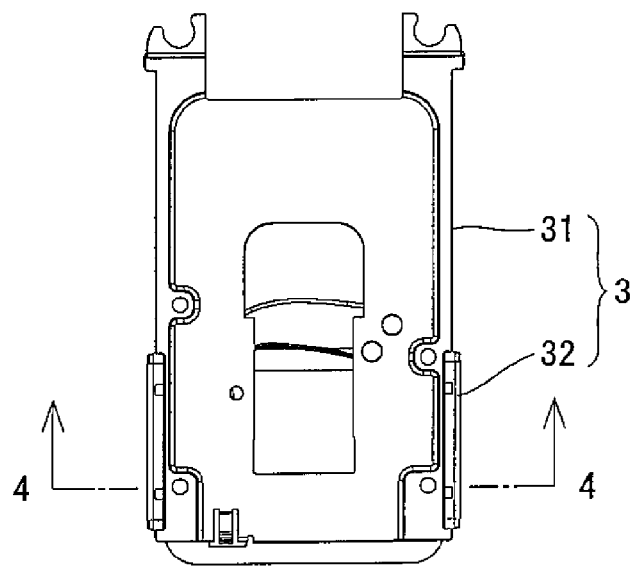
FIG. 3 is a plan view illustrating a sliding mechanism included in the slide mobile phone.
Figure 4:
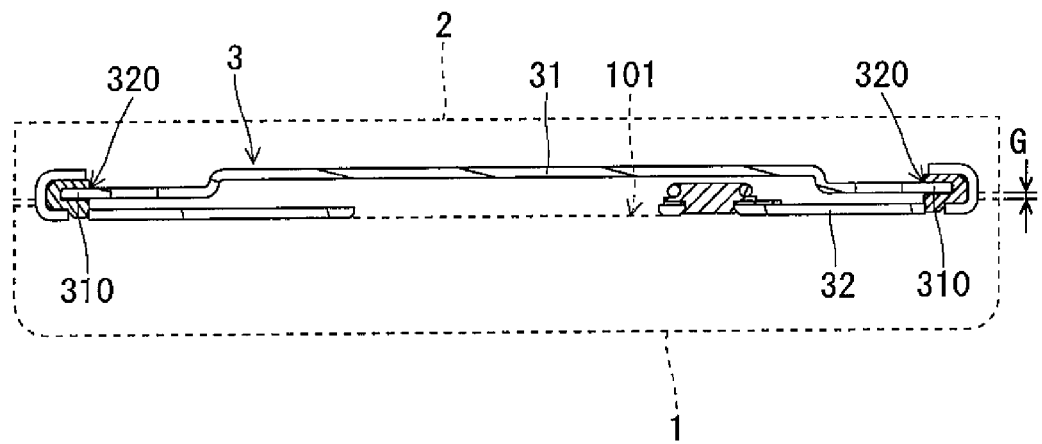
FIG. 4 is a cross-sectional view taken along line 4-4 in FIG. 3.

FIG. 3 is a plan view illustrating the sliding mechanism 3. FIG. 4 is a cross-sectional view taken along line 4-4 in FIG. 3. As illustrated in FIG. 4, a pair of left and right guiding grooves 320 is provided at both end positions of the slide regulating portion 32, and left and right edge portions 310 of the slider 31 slidably engage the pair of guiding grooves 320. In this manner, the slide regulating portion 32 regulates a sliding direction of the slider 31 to a longitudinal direction 91 (refer to FIG. 1) of the first cabinet 1.

Figure 5:
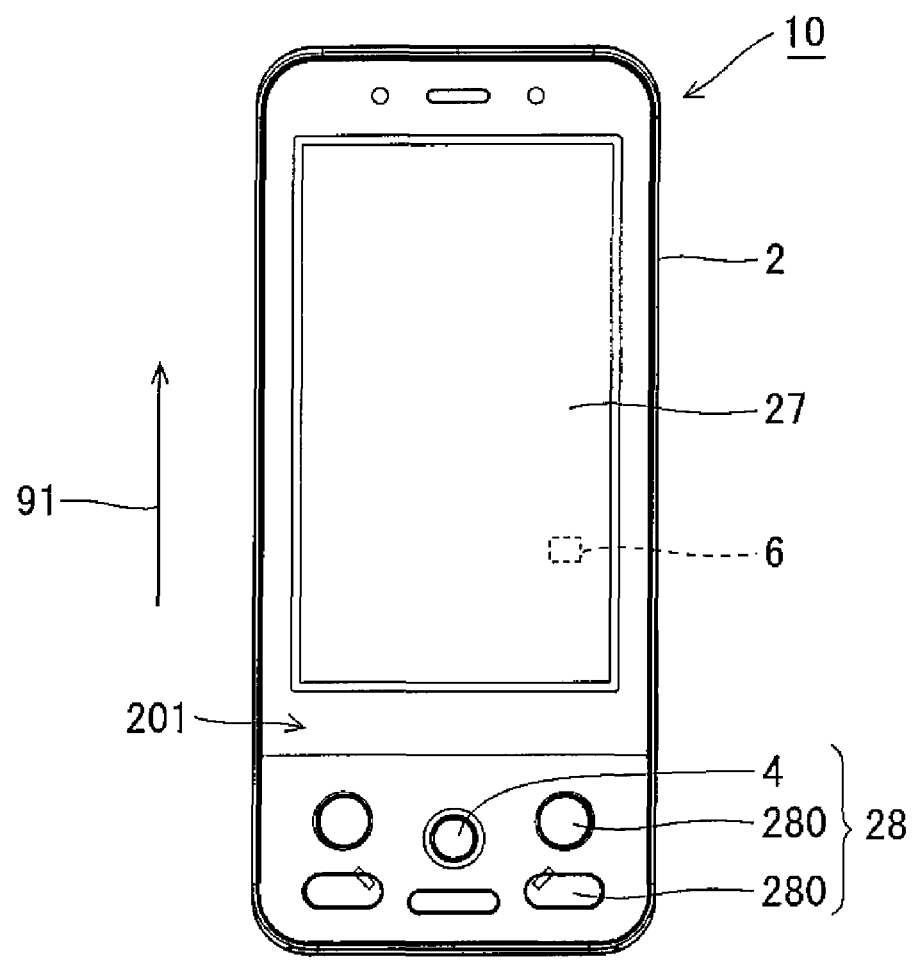
FIG. 5 is a front view used for describing a closed state of a slide mobile phone of the slide mobile phone.
Figure 6:
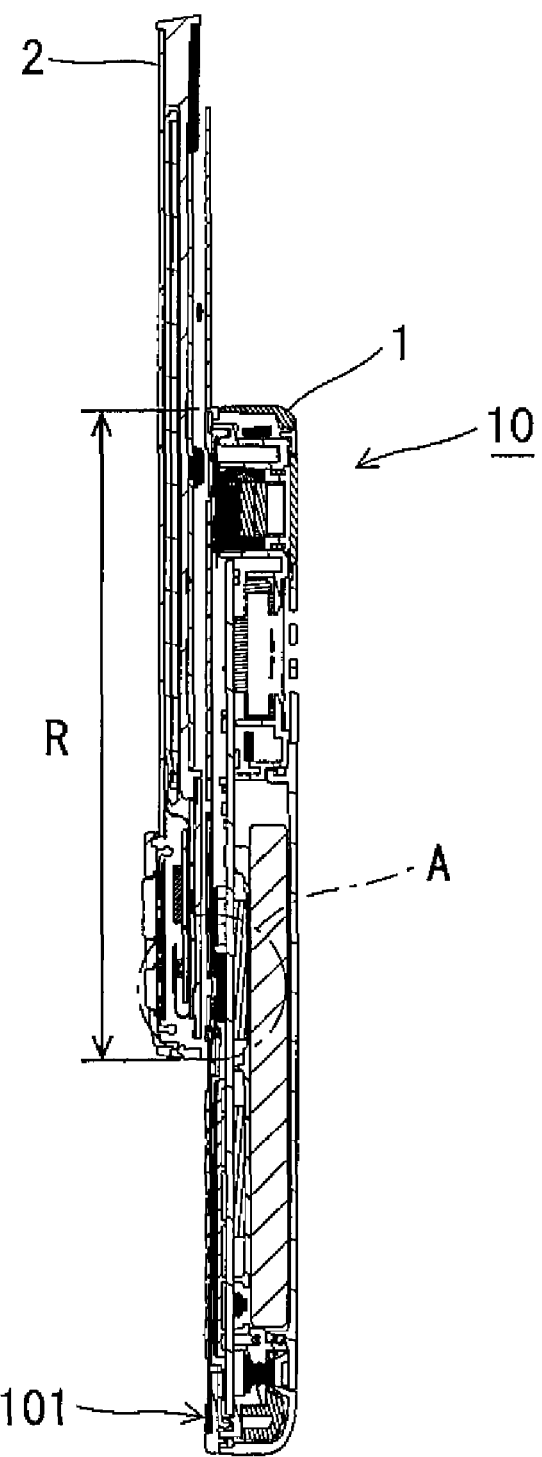
FIG. 6 is a cross-sectional view taken along line 6-6 in FIG. 1.

Therefore, by relatively moving the first cabinet 1 and the second cabinet 2 in the sliding direction, the slide mobile phone 10 described above is capable of alternating states between a closed state illustrated in FIG. 5 in which both cabinets 1 and 2 are closed and the entire first operating unit 18 is covered by the second cabinet 2 and an opened state illustrated in FIG. 1 in which both cabinets 1 and 2 are opened and the entire first operating unit 18 is exposed. In addition, as illustrated in FIG. 6, a covered region R that is covered by the second cabinet 2 regardless of whether the slide mobile phone 10 is set to the closed state or the opened state is provided on the front surface 101 of the first cabinet 1.

When the slide mobile phone 10 is set to the opened state as illustrated in FIG. 1, a user of the slide mobile phone described above can operate the slide mobile phone using the first operating unit 18 and the second operating unit 28. In addition, even when the slide mobile phone 10 is set to the closed state as illustrated in FIG. 5, the user can operate the slide mobile phone 10 using the second operating unit 28.

Figure 7:
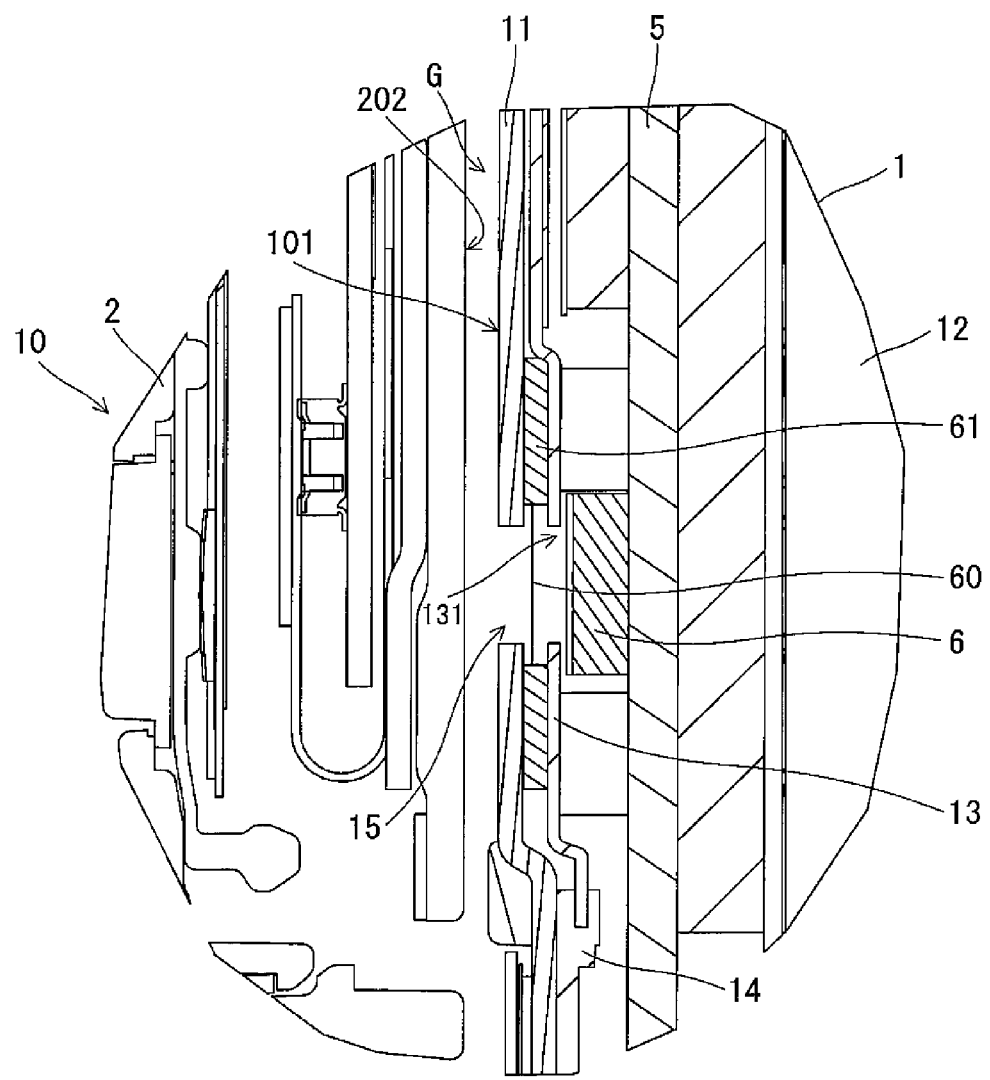
FIG. 7 is an enlarged view of region A in FIG. 6.

In the sliding mechanism 3 described above, the slide regulating portion 32 further regulates a height position of the slider 31 from the front surface 101 of the first cabinet 1 as illustrated in FIG. 4. Specifically, the slide regulating portion 32 regulates the height position of the slider 31 to a position that enables a gap G to be formed between the first cabinet 1 and the second cabinet 2. Therefore, as illustrated in FIGS. 4 and 7, in an assembled state of the slide mobile phone 10, the gap G is formed between the first cabinet 1 and the second cabinet 2, by the sliding mechanism 3. In the present embodiment, a width of the gap G is set to around 0.4 mm.

As illustrated in FIG. 2, the first cabinet 1 is constituted by a front surface-side case half body 11 that forms the front surface 101 of the first cabinet 1 and a rear surface-side case half body 12 that forms the rear surface 102 of the first cabinet 1, wherein the front surface-side case half body 11 and the rear surface-side case half body 12 are joined to each other. A circuit board 5 is provided inside the first cabinet 1. Moreover, the circuit board 5 is shaped so as to expand over a wide range along the front surface 101 of the first cabinet 1. Therefore, in the circuit board 5, at least the region in which the first operating unit 18 is provided and the covered region R (refer to FIG. 6) among the front surface 101 of the first cabinet 1 overlap each other.

As illustrated in FIG. 2, the first cabinet 1 is further provided with a metallic plate 13 that covers the region overlapped by the covered region R among a surface of the circuit board 5, and a sealing member 14 to be interposed between joint surfaces of the front surface-side case half body 11 and the rear surface-side case half body 12. Moreover, a cover portion 141 having a part thereof that spreads from the region between the joint surfaces to the inside of the slide mobile phone 10 so as to cover an entire region that is not covered by the metallic plate 13 among the surface of the circuit board 5 is formed on the sealing member 14. In addition, the metallic plate 13 and the sealing member 14 are integrally formed without having a gap provided therebetween.

A first through-hole 15 that extends from the front surface 101 of the first cabinet 1 to an inner space is opened in the covered region R of the front surface 101 of the first cabinet 1. In addition, a second through-hole 131 that extends from a front surface of the metallic plate 13 to a rear surface thereof is opened on the metallic plate 13 in a region opposing the first through-hole 15. The gap G is to be formed between the first cabinet 1 and the second cabinet 2 in an assembled state of the slide mobile phone. Therefore, the first through-hole 15 and the second through-hole 131 communicate with the outside of the slide mobile phone 10 via the gap G regardless of whether the slide mobile phone 10 is set to the closed state or the opened state.

In the state where the first cabinet 1 is set to the opened state, the through-hole 15 is not directly exposed to outside, so that the waterproof and dustproof properties can be improved.

Meanwhile, as illustrated in FIG. 7 (also refer to FIG. 2), a waterproof sheet 60 covering the second through-hole 131 is adhered and fixed to the surface of the metallic plate 13, whereby the waterproof property is further improved. Specifically, the waterproof sheet 60 is adhered and fixed to the surface of the metallic plate 13 by an adhesive tape 61. The waterproof sheet 60 has both waterproofing and aeration properties. The waterproof sheet 60 is resistant to passage of water while permitting passage of sound. For example, a GORE-TEX (trademark) sheet manufactured by Japan Gore-Tex Inc. can be used as the waterproof sheet 60. It is needless to say that various sheets having waterproofing and aeration properties can be adopted as the waterproof sheet 60.

According to the configuration of the first cabinet 1 described above, penetration of water from between the joint surfaces of the front surface-side case half body 11 and the rear surface-side case half body 12 is to be inhibited by the sealing member 14. In addition, even if water penetrates into the first cabinet 1 from the first through-hole 15, the water is prevented from passing through the second through-hole 131 and reaching the circuit board 5 by the waterproof sheet 60. Furthermore, even when water penetrates into the first cabinet 1 from the side of the front surface 101 of the first cabinet 1, the water is inhibited from reaching the circuit board 5 by the integrally-formed metallic plate 13 and sealing member 14. In this manner, the first cabinet 1 is provided with a waterproofing structure.

As illustrated in FIG. 7 (also refer to FIG. 2), a microphone 6 is provided on the surface of the circuit board 5 in a posture in which a sound collecting face of the microphone 6 faces the second through-hole 131. Moreover, the first through-hole 15 and the second through-hole 131 communicate with the outside of the slide mobile phone 10 via the gap G between the first cabinet 1 and the second cabinet 2. Therefore, a sound outside of the slide mobile phone 10 enters the inside of the slide mobile phone 10 through the gap G between the first cabinet 1 and the second cabinet 2 and subsequently passes through the first through-hole 15 and the second through-hole 131 to reach the sound collecting face of the microphone 6. In other words, the first through-hole 15 and the second through-hole 131 function as sound collecting holes. Therefore, in the slide mobile phone 10 described above, a sound outside the slide mobile phone 10 can be clearly captured by the microphone 6.

In the slide mobile phone 10 described above, the covered region R is not exposed even if the slide mobile phone 10 is set to the opened state, and the first through-hole 15 that functions as a sound collecting hole is formed in the covered region R. Therefore, as illustrated in FIG. 1, an entire region that is exposed when the slide mobile phone 10 is set to the opened state among the front surface 101 of the first cabinet 1 can be used as a region in which the first operating unit 18 is provided. Consequently, compared to a conventional slide mobile phone, the slide mobile phone 10 can be downsized while ensuring a sufficient area available to install the first operating unit 18. Therefore, even when the slide mobile phone 10 is downsized, the operability and the visibility of the slide mobile phone can be maintained.

In addition, in the slide mobile phone 10 described above, the region in which the first operating unit 18 is provided may be expanded to increase the sizes of the respective operating keys 180 that constitute the first operating unit 18. According to this configuration, the operability of the slide mobile phone 10 can be improved.

Moreover, the respective components of the present invention are not limited to the embodiment described above, and various modifications can be made without departing from the spirit and scope of the present invention as described in the claims. In the slide mobile phone 10 described above, a display unit such as a liquid crystal display panel may be provided on the front surface 101 of the first cabinet 1 in addition to, or in place of, the first operating unit 18. In addition, only the display unit, i.e., the liquid crystal display panel 27 may be provided on the front surface 201 of the second cabinet 2. Furthermore, a touch panel-type liquid crystal display panel that becomes the operating unit and/or the display unit may be provided on the front surface 101 of the first cabinet 1 and/or the front surface 201 of the second cabinet 2. Moreover, the display unit may be constituted using various image display panels such as an organic EL (Electroluminescence) display panel or an LED (Light Emitting Diode) display panel in place of the liquid crystal panel.

In the slide mobile phone 10 described above, when the slide mobile phone 10 is set to the opened state, a part of the first operating unit 18 instead of the entire first operating unit 18 may be exposed from the second cabinet 2. In addition, the slider 31 of the sliding mechanism 3 may be fixed to the front surface 101 of the first cabinet 1 and the slide regulating portion 32 of the sliding mechanism 3 may be fixed to the rear surface 202 of the second cabinet 2.

The respective components adopted in the slide mobile phone described above can be applied to various slidable portable electronic devices such as a PDA (Personal Digital Assistant).

What is claimed is:

1. A slidable portable electronic device comprising a first cabinet and a second cabinet slidably coupled on a surface of the first cabinet, the first cabinet comprising:

an operating unit and/or a display unit provided on a first area of a surface of the first cabinet, the first area being exposed in an opened state which is set by slidingly moving the second cabinet in the opening direction with respect to the first cabinet;

a through-hole formed extending to an inner space from a second area of the surface of the first cabinet, the second area remaining unexposed in the opened state;

a microphone having a sound collecting face and provided on the inner space side of the first cabinet, with the sound collecting face facing the through-hole; and a gap formed between the first cabinet and the second cabinet and communicating with the through-hole, wherein said slidable portable electronic device includes a sealing member and a waterproof sheet covering a second through-hole, wherein said waterproof sheet prevents water from penetrating said second through-hole in the event water is penetrated through said first through-hole.

2. The slidable portable electronic device according to claim 1 wherein the device further comprises a sliding mechanism provided between the first cabinet and the second cabinet and adapted to slidably couple the first cabinet and the second cabinet together, the sliding mechanism comprising:

a slider fixed to one opposed surface of opposed surfaces of the first cabinet and the second cabinet;

a slide regulating portion fixed to the other opposed surface of the opposed surfaces of the first cabinet and the second cabinet and adapted to regulate a sliding direction of the slider and a height position of the slider from the other opposed surface; and the sliding mechanism providing the gap formed between the first cabinet and the second cabinet.

3. The slidable portable electronic device according to claim 1 wherein the device comprises a slide mobile phone.

* * * * *